(12) United States Patent
Gutta

(10) Patent No.: US 6,766,035 B1
(45) Date of Patent: Jul. 20, 2004

(54) METHOD AND APPARATUS FOR ADAPTIVE POSITION DETERMINATION VIDEO CONFERENCING AND OTHER APPLICATIONS

(75) Inventor: Srinivas Gutta, Buchanan, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/564,016

(22) Filed: May 3, 2000

(51) Int. Cl.$^7$ ............................................. G06K 9/00
(52) U.S. Cl. ............................................. 382/103
(58) Field of Search ..................... 382/103; 348/169, 348/170, 172, 15, FOR 178

(56) References Cited

U.S. PATENT DOCUMENTS

| | | | |
|---|---|---|---|
| 5,206,721 A | * 4/1993 | Ashida et al. | 348/14.1 |
| 5,263,120 A |   11/1993 | Bickel | 395/11 |
| 5,508,734 A |    4/1996 | Baker et al. | 348/36 |
| 5,631,697 A | * 5/1997 | Nishimura et al. | 348/172 |
| 5,686,957 A |   11/1997 | Baker | 348/36 |
| 5,764,283 A |    6/1998 | Pingali et al. | 348/169 |
| 5,796,924 A |    8/1998 | Errico et al. | 395/23 |
| 6,002,428 A |   12/1999 | Matsumura et al. | 348/169 |
| 6,072,522 A | * 6/2000 | Ippolito et al. | 348/14.1 |
| 6,118,484 A | * 9/2000 | Yokota et al. | 348/350 |
| 6,263,088 B1 | * 7/2001 | Crabtree et al. | 382/103 |

FOREIGN PATENT DOCUMENTS

| EP | 0436913 A2 | 7/1991 | G06K/9/62 |
|---|---|---|---|
| WO | WO0002388 | 7/1999 | H04N/7/14 |

\* cited by examiner

*Primary Examiner*—Leo Boudreau
*Assistant Examiner*—Tom Y. Lu (57) ABSTRACT

Methods and apparatus are disclosed for tracking an object of interest in a video processing system, using clustering techniques. An area is partitioned into approximate regions, referred to as clusters, each associated with an object of interest. Each cluster has associated average pan, tilt and zoom values. Audio or video information, or both, are used to identify the cluster associated with a speaker (or another object of interest). Once the cluster of interest is identified, the camera is focused on the cluster, using the recorded pan, tilt and zoom values, if available. An event accumulator initially accumulates audio (and optionally video) events for a specified time, to allow several speakers to speak. The accumulated audio events are then used by a cluster generator to generate clusters associated with the various objects of interest. After initialization of the clusters, the illustrative event accumulator gathers events at periodic intervals. The mean of the pan and tilt values (and zoom value, if available) occurring in each time interval are then used to compute the distance between the various clusters in the database by a similarity estimator, based on an empirically-set threshold. If the distance is greater than the established threshold, then a new cluster is formed, corresponding to a new speaker, and indexed into the database. Fuzzy clustering techniques allow the camera to be focused on more than one cluster at a given time, when the object of interest may be located in one or more clusters.

8 Claims, 7 Drawing Sheets

10
METHOD AND APPARATUS FOR ADAPTIVE POSITION DETERMINATION VIDEO CONFERENCING AND OTHER APPLICATIONS

FIELD OF THE INVENTION

The present invention relates generally to the field of video signal processing, and more particularly to techniques for identifying the location of persons or other objects of interest using a video camera such that a desired video output can be achieved.

BACKGROUND OF THE INVENTION

The tracking of a person or another object of interest in an image is an important aspect of video-camera-based systems such as video conferencing systems and video surveillance systems. For example, in a video conferencing system, it is often desirable to frame the head and shoulders of a particular conference participant in the resultant output video signal.

Video conferencing systems often utilize a pan-tilt-zoom (PTZ) camera to track an object of interest. The PTZ camera allows the system to position and optically zoom the camera to perform the tracking task. A problem with this approach is that, in some cases, the tracking mechanism is not sufficiently robust to adapt to sudden changes in the position of the object of interest. This may be due to the fact that the camera is often being zoomed-in too far to react to the sudden changes. For example, it is not uncommon in a video conferencing system for participants to move within their seats, for example, to lean forward or backward, or to one side or the other. If a PTZ camera is zoomed-in too far on a particular participant, a relatively small movement of the participant may cause the PTZ camera to lose track of that participant, necessitating zoom-out and re-track operations that will be distracting to a viewer of the resultant output video signal.

Initially, control systems for PTZ cameras in a video conferencing system required an operator to make manual adjustments to the camera to maintain the focus on the current speaker. Increasingly, however, users of video conferencing systems demand hands-free operation, where the control of the PTZ camera must be fully automatic. A number of techniques have been proposed or suggested for automatically detecting a person based on audio and video information. An audio locator processes audio information obtained from an array of microphones and determines the position of a speaker. Specifically, when the relative microphone positions are known, the position of the sound source can be determined from the estimated propagation time differences of sound waves from a single source using well-known triangulation techniques.

Similarly, a video locator locates one or more objects of interest in a video image. In the context of a video conferencing system, the objects of interest are the head and shoulders of the speakers. The video locator frames the head and shoulders of the speaker using information about the head size and location of the speaker in the image. A number of well-known techniques are available for detecting the location of a person in an image, including skin tone detection, face detection and background subtraction. For a more detailed discussion of these techniques for detecting the location of a person in an image, see, for example, "Face Recognition: From Theory to Applications" (NATO ASI Series, Springer Verlag, New York, H. Wechsler et al., editors, 1998), incorporated by reference herein.

A need therefore exists for an improved technique that can detect persons in image processing systems, such as video conferencing systems. A further need exists for methods and apparatus for detecting persons in such image processing systems with a reduced computational load.

SUMMARY OF THE INVENTION

Generally, methods and apparatus are disclosed for tracking an object of interest in a video processing system, using clustering techniques. Specifically, the present invention partitions an area into an approximate region, referred to as a cluster, that are each associated with an object of interest. Each cluster has associated with it average pan, tilt and zoom values. In an illustrative video conference implementation, audio or video information, or both, are used to identify the cluster associated with a speaker. Once the cluster of the speaker is identified, the camera is focused on the cluster, using the recorded pan, tilt and zoom values, if available.

In one implementation, an event accumulator initially accumulates audio (and optionally video) events for a specified time, such as approximately 3 to 5 seconds, to allow several speakers to speak. The accumulated audio events are then used by a cluster generator to generate clusters associated with the various objects of interest. The illustrative cluster generator utilizes two stages, namely, an unsupervised clustering stage, such as a subtractive clustering technique, and a supervised clustering stage, such as an iterative optimization-based clustering technique (i.e., K-means clustering). Once the initial clusters are formed, they are then indexed into a position history database with the pan and tilt values for each cluster, as well as the zoom factor, if available, equal to the corresponding cluster mean pan, tilt and zoom values.

After initialization of the clusters, the illustrative event accumulator gathers events at periodic intervals, such as every 2 seconds. The mean of the pan and tilt values (and zoom value, if available) occurring in each time interval are then used to compute the distance (e.g., Euclidean distance) between the various clusters in the database by a similarity estimator, based on an empirically-set threshold. If the distance is greater than the established threshold, then a new cluster is formed, corresponding to a new speaker, and indexed into the database. Otherwise, the camera is focused on the identified cluster.

In a further variation, fuzzy clustering techniques are employed to focus the camera on more than one cluster at a given time, when the object of interest may be located in one or more clusters. Generally, a membership value is assigned to each cluster that indicates the likelihood that a given data point belongs to the cluster. If the membership value does not clearly suggest a particular cluster, then the camera may be simultaneously focused on the plurality of clusters with the highest membership values.

A more complete understanding of the present invention, as well as further features and advantages of the present invention, will be obtained by reference to the following detailed description and drawings.

DETAILED DESCRIPTION OF THE INVENTION

Figure 1:
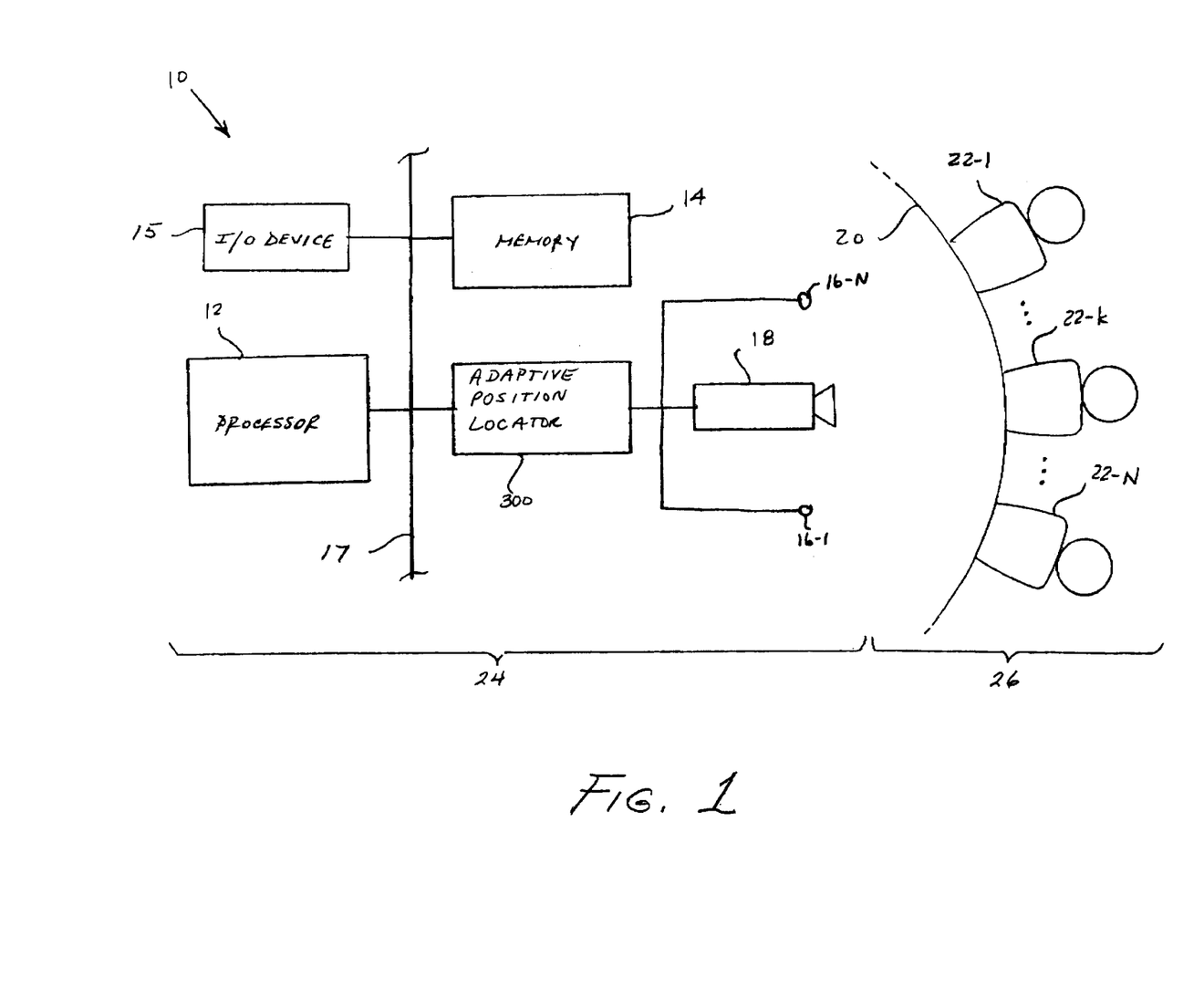
FIG. 1 is a block diagram of a video processing system in accordance with an illustrative embodiment of the invention.

FIG. 1 shows a video processing system 10 in accordance with an illustrative embodiment of the invention. The system 10 includes a processor 12, a memory 14, an input/output (I/O) device 15 and an adaptive position locator 300, discussed further below in conjunction with FIG. 3, all connected to communicate:over a system bus 17. The system 10 further includes a pan-tilt-zoom (PTZ) camera 18 that is coupled to the adaptive position locator 300 as shown.

In the illustrative embodiment, the PTZ camera 18 is employed in a video conferencing application in which a table 20 accommodates a number of conference participants 22-1, . . . , 22-k, . . . , 22-N. In operation, the PTZ camera 18, as directed by the adaptive position locator 300 in accordance with instructions received from the processor 12, tracks an object of interest that in this example application corresponds to a particular participant 22-k. In addition, as shown in FIG. 1, the video processing system 10 includes an array 16 of microphones for capturing audio information, in a known manner.

Although the invention is illustrated in the context of a video conferencing application, it should be understood that the video processing system 10 can be used in a wide variety of other applications. For example, a portion 24 of the system 10 can be used in video surveillance applications, and in other types of video conferencing applications, e.g., in applications involving congress-like seating arrangements, circular or rectangular table arrangements, etc. More generally, the, portion 24 of system 10 can be used in any application that can benefit from the improved tracking function provided by the adaptive position locator 300 disclosed herein. The portion 26 of the system 10 may therefore be replaced with, e.g., other video conferencing arrangements, video surveillance arrangements, or any other arrangement of one or more objects of interest to be tracked using the portion 24 of the system 10. It will also be apparent that the invention can be used with image capture devices other than PTZ cameras. The term "camera" as used herein is therefore intended to include any type of image capture device which can be used in conjunction with the adaptive position locator 300 disclosed herein.

It should be noted that elements or groups of elements of the system 10 may represent corresponding elements of an otherwise conventional desktop or portable computer, as well as portions or combinations of these and other processing devices. Moreover, in other embodiments of the invention, some or all of the functions of the processor 12, controller 16 or other elements of the system 10 may be combined into a single device. For example, one or more of the elements of system 10 may be implemented as an application specific integrated circuit (ASIC) or circuit card to be incorporated into a computer, television, set-top box or other processing device. The term "processor" as used herein is intended to include a microprocessor, central processing unit, microcontroller or any other data processing element that may be utilized in a given data processing device. In addition, it should be noted that the memory 14 may represent an electronic memory, an optical or magnetic disk-based memory, a tape-based memory, as well as combinations or portions of these and other types of storage devices.

ADAPTIVE POSITION TRACKING TERMINOLOGY

Figure 2:
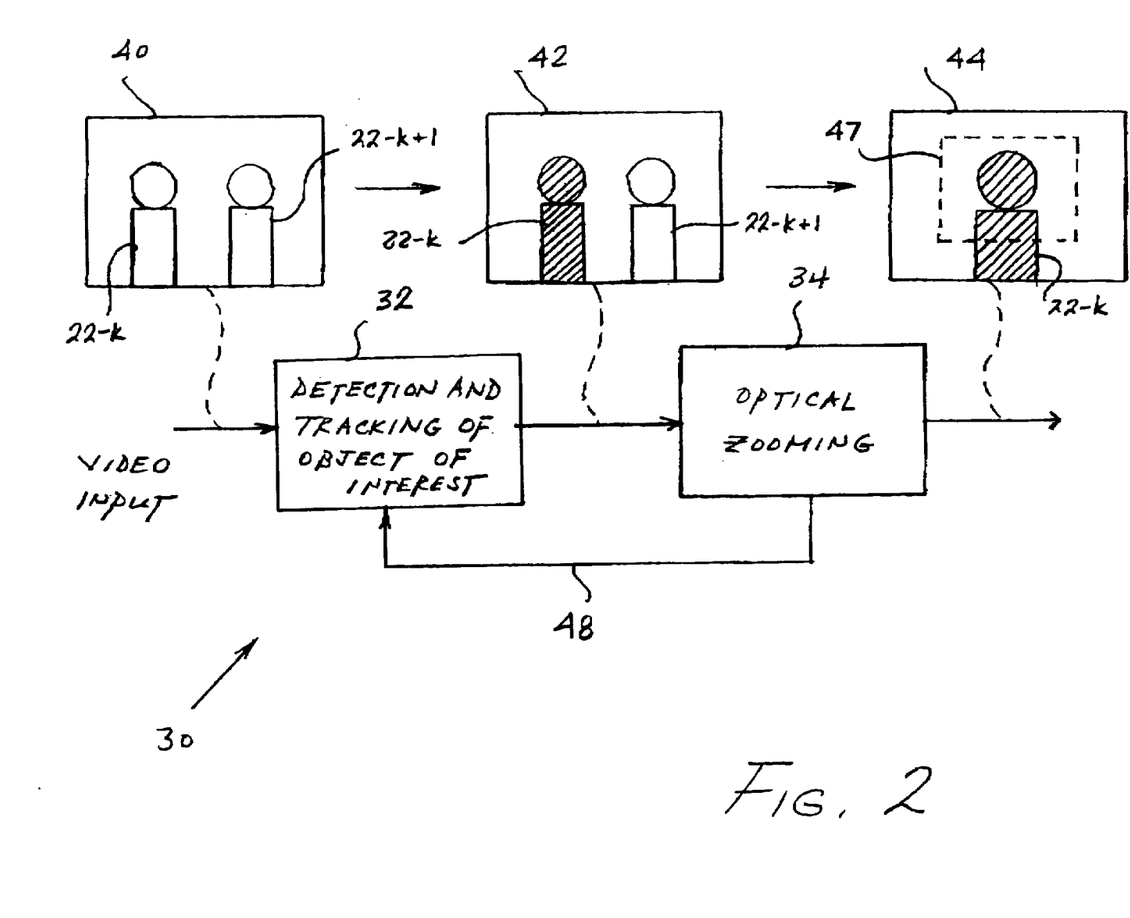
FIG. 2 is a functional block diagram illustrating adaptive tracking video processing operations implemented in the system of FIG. 1.

FIG. 2 is a functional block diagram illustrating the tracking and zoom features implemented by the adaptive position locator 300 of FIG. 1. Again, although illustrated in the context of a video conferencing application, it will be apparent that the techniques described are readily applicable to any other tracking application. As shown in FIG. 2, the tracking and zoom features include a detection and tracking operation 32 and an optical zooming operation 34. These operations will be described with reference to images 40, 42 and 44 that correspond to images generated for the exemplary video conferencing application in portion 26 of system 10. The operations 32 and 34 may be implemented in system 10 by processor 12 and adaptive position locator 300, utilizing one or more software programs stored in the memory 14 or accessible via the I/O device 15 from a local or remote storage device.

In operation, PTZ camera 18 generates image 40 that includes an object of interest, i.e., video conference participant 22-k, and an additional object, i.e., another participant 22-k+1 adjacent to the object of interest. The image 40 is supplied as a video input to the detection and tracking operation 32, which detects and tracks the object of interest 22-k using well-known conventional detection and tracking techniques.

For example, in the video conferencing application, the object of interest 22-k may correspond to the current speaker. In this case, the detection and tracking operation 32 may detect and track the object of interest 22-k using audio location such as to determine which conference participant is the current speaker, discussed further below in conjunction with FIG. 3. In further variations, the current speaker may be identified, for example, using motion detection, gesturing, shaking his or her head, moving in a particular manner or speaking in a particular manner.

In a video surveillance application, the object of interest may be a person taking a particular action, e.g., entering or leaving a restricted area or engaging in suspicious behavior, a child moving about in a room of a home, a vehicle entering or leaving a parking garage, etc. The output of the detection and tracking operation 32 includes information identifying the particular object of interest 22-k, which is shown as shaded in the image 42.

The optical zooming operation 34 of FIG. 2 provides a sufficient amount of zooming to ensure that a desired output image quality can be achieved, while also allowing for a certain amount of movement of the object of interest. The optical zooming operation 34 includes a framing portion with pan and tilt operations for framing the object of interest 22-k, followed by a zooming portion with a zooming operation that continues until designated stopping criteria are satisfied, discussed further below in conjunction with FIG. 3. Generally, there are a number of different types of stopping criteria that may be used. In a fixed stopping criteria approach, the optical zooming continues until the object of interest occupies a fixed percentage of the image. For example, in a video conferencing system, the optical zooming may continue until the head of the current speaker occupies between about 25% and 35% of the vertical size of the image. Of course, the specific percentages used will vary depending upon the tracking application. The specific percentages suitable for a particular application can be determined in a straightforward manner by those of ordinary skill in the art.

As shown in FIG. 2, the result of the optical zooming operation 34 is an optically-zoomed image 44, in which the object of interest 22-k is approximately centered within the image and occupies a desired percentage of the image as determined based on the above-described criteria. The image 44 may be stored by the system 10, e.g., in memory 14.

ADAPTIVE POSITION LOCATOR

Figure 3:
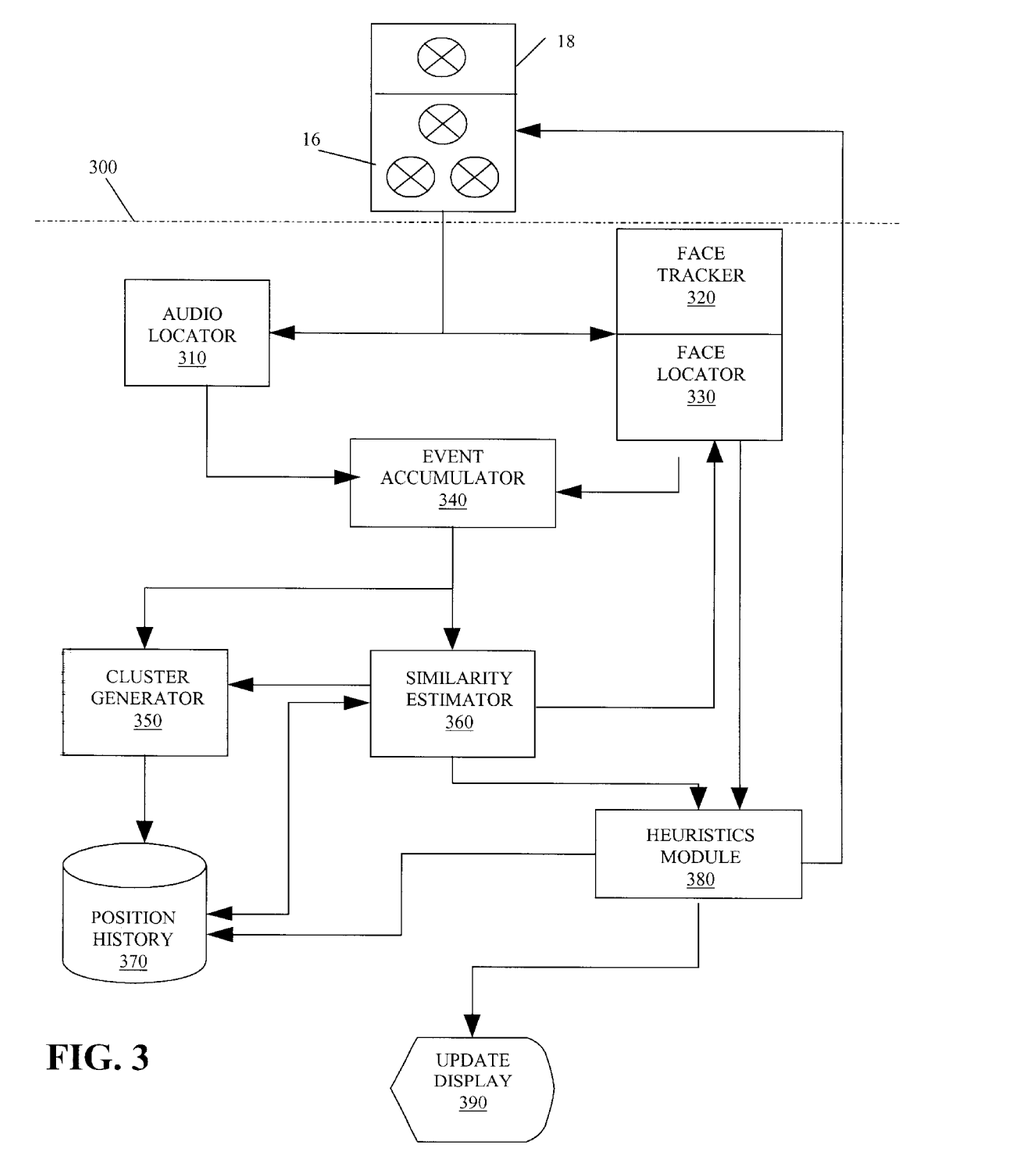
FIG. 3 is a functional block diagram illustrating the adaptive position locator of FIG. 1.

FIG. 3 is a functional block diagram illustrating an adaptive position locator 300 implemented in the system 10 of FIG. 1. As shown in FIG. 3, the adaptive position locator 300 includes an audio locator 310, face tracker 320, face locator 330, event accumulator 340, cluster generator 350, similarity estimator 360, position history database 370, heuristics module 380 and an update display module 390.

As discussed further below, the present invention utilizes an event accumulator 340 that initially accumulates audio events for a specified time, such as approximately 3 to 5 seconds. The accumulated audio events are then used by the cluster generator 350, discussed further below in conjunction with FIG. 5, to generate clusters associated with the various objects of interest. As discussed further below in conjunction with FIGS. 5 through 7, the illustrative cluster generator 350 utilizes two stages. In a first clustering stage, unsupervised clustering is performed, such as a subtractive clustering technique. Generally, subtractive clustering is a fast one-pass algorithm for estimating the number of clusters and the cluster centers in a set of data. In subtractive clustering techniques, the number of clusters generally does not need to be specified, while the approximate width of each cluster must be specified.

The cluster estimates are then used to initialize the second clustering stage, where iterative optimization-based clustering methods are performed, such as K-means clustering. Once the initial clusters are formed, they are then indexed into the position history database 370 with the pan and tilt values for each cluster, equal to the corresponding cluster mean pan and tilt values. If the zoom factor is available from the event accumulator 340, then the zoom factor also becomes part of the cluster record. Thus, each cluster is represented by its corresponding pan, tilt and zoom factor values, if available.

After initialization of the clusters, the illustrative event accumulator 340 is reset to gather events every 2 seconds. The mean of the pan and tilt values occurring in each 2 second time interval are then used to compute the distance (e.g., Euclidean distance) between the various clusters in the database 370 by the similarity estimator 360, discussed further below in conjunction with FIG. 8, based on an empirically-set threshold. If the distance is greater than the established threshold, then a new cluster is formed, corresponding to a new speaker, and indexed into the database 370.

The mean of the pan and tilt values for each 2 second interval are also used to adjust the position of the camera 18, if necessary. In addition, a zoom factor may also be available from the face locator module 330. Thus, for each 2 second interval, the pan, tilt and zoom factor values, if available, are recorded as a variable length record, based on an empirically set threshold through the heuristics module 380. The frequency of usage for the zoom factors and the pan, tilt will be maintained in order to ascertain the position and movement of the participants 22-N in the session.

The heuristics module 380 controls the camera 18 and positions the camera 18 in the direction ascertained by the face locator 330. In addition, the heuristics module 380 is used to decide when to update the display at the receiver (not shown). Generally, the heuristics module 380 employs techniques to keep the camera 18 focused on the current speaker, regardless of other noises, short utterances by other people or movements of the speaker. In other words, the heuristics module 380 attempts to identify false events generated by the audio locator 310 or face locator 330. For a detailed discussion of various strategies that may be implemented by the heuristics module 380, see, for example, Ramesh Jain et al., "Machine Vision", McGraw-Hill, New York (1995), incorporated by reference herein.

As previously indicated, the event accumulator 340 accumulates events for some specified time period and passes those events to the cluster generator 350 during the initialization of the system 10. The time limit is selected such that at least a sufficient number of people have spoken. It has been observed that a time limit on the order of 5 seconds would be appropriate. It is noted that an audio event is generated by the illustrative audio locator 310 every 33 milliseconds. The specific information contained by the audio event includes the pan (horizontal) and tilt (vertical) angles. The audio locator 310 may be embodied using the audio location system described for example, in U.S. patent application Ser. No. 09/548,734, filed Apr. 13, 2000, entitled "Method and Apparatus for Tracking Moving Objects Using Combined Video and Audio Information in Video Conferencing and Other Applications," and U.S. patent application Ser. No. 09/436,193, filed Nov. 8, 1999, entitled "Improved Signal Localization Arrangement," each assigned to the assignee of the present invention and incorporated by reference herein.

The specific information contained in a video event is the zoom factor. The face tracker 320 and face locator 330 may be embodied using the video location system described for example, in U.S. patent application Ser. No. 09/449,250, filed Nov. 24, 1999, entitled "Method and Apparatus for Detecting Moving Objects In Video Conferencing and Other Applications," and U.S. patent application Ser. No. 09/548,734, filed Apr. 13, 2000, entitled "Method and Apparatus for Tracking Moving Objects Using Combined Video and Audio Information in Video Conferencing and Other Applications," each assigned to the assignee of the present invention and incorporated by reference herein. As discussed above in conjunction with FIG. 2, the video system also tries to focus (zoom) onto the face such that the face is at a correct aspect ratio for display. If the zoom factor is not available then the zoom factor is not passed onto the cluster generator 350. In the illustrative embodiment,sa video event is generated every 100 milliseconds.

Figure 4:
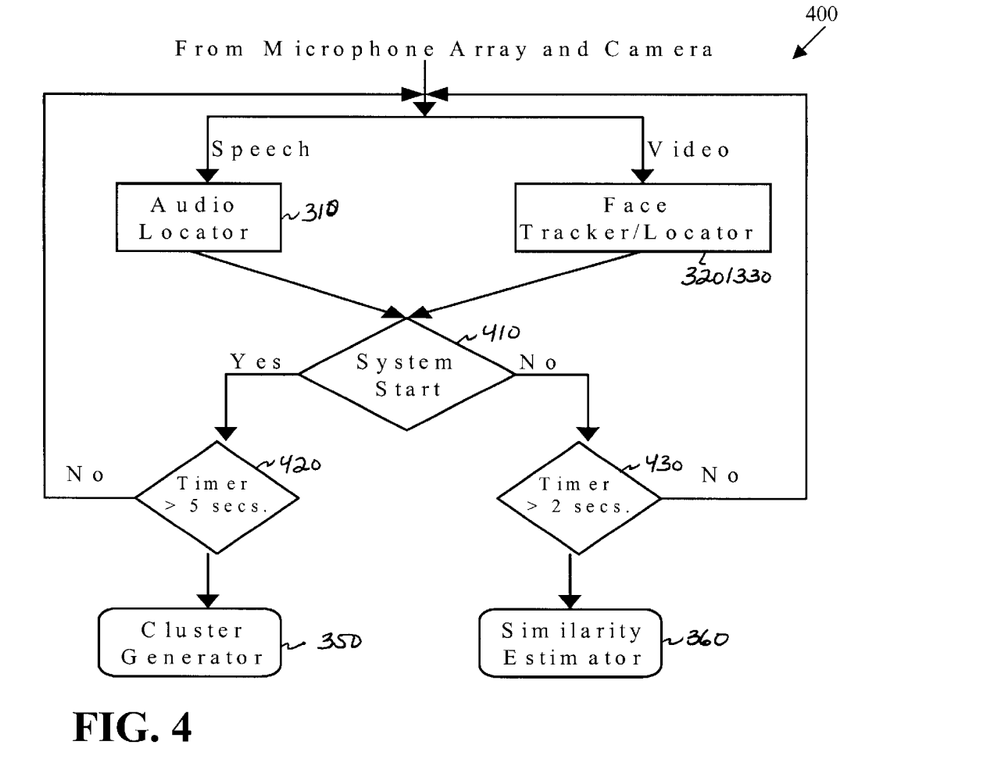
FIG. 4 is a flow chart describing the event accumulator of FIG. 3 from a process point of view.

FIG. 4 is a flow chart describing the event accumulator 340 from a process point of view. As shown in FIG. 4, the event accumulator 340 receives speech and video information from the microphone array 16 and camera 18, respectively. The speech information is applied to the audio locator 310 and the video information is applied to the face tracker/locator 320/330, as discussed above.

A test is performed during step 410 to determine if the current time period is still part of the specified system start-up time. In the illustrative embodiment, the start-up time is 3 to 5 seconds. If it is determined during step 410 that the current time period is still part of the specified system start-up time, then a further test is performed during step 420 to determine if the timer has exceeded five seconds.

If it is determined during step 420 that the timer has not yet exceeded five seconds, then program control returns to the beginning to continue processing audio and video information from the microphones and camera 16, 18. If, however, it is determined during step 420 that the timer has exceeded five seconds, then the accumulated information is applied to the cluster generator 350, discussed below in conjunction with FIG. 5.

If it is determined during step 410 that the current time period is no longer part of the specified system start-up time, then a further test is performed during step 430 to determine if the timer has exceeded two seconds. If it is determined during step 430 that the timer has not yet exceeded two seconds, then program control returns to the beginning to continue processing audio and video information from the microphones and camera 16, 18. If, however, it is determined during step 430 that the timer has exceeded two seconds, then the accumulated information is applied to the similarity estimator 360, discussed further below in conjunction with FIG. 8.

Figure 5:
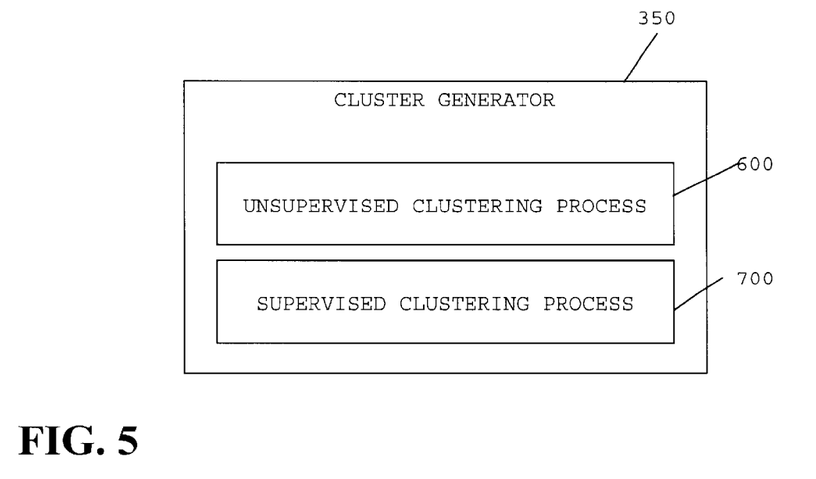
FIG. 5 is a block diagram of the cluster generator of FIG. 3.

As previously indicated, the cluster generator 350, shown in FIG. 5, works in two sequential stages, in an unsupervised and then in a supervised mode. An unsupervised clustering process 500, shown in FIG. 6, employs a subtractive clustering process. The clusters found by the unsupervised clustering process 600 are then passed onto a supervised clustering process 700, shown in FIG. 7, that employs a k-means clustering process for fine-tuning. Subtractive clustering is completely unsupervised in the sense that the number of clusters need not be specified. The only parameter that is specified is the expected spread of the clusters. Once the clusters are found, the number of clusters is passed onto the k-means clustering process. Thus, the k-mean clustering process takes one parameter, the number of clusters.

Figure 6:
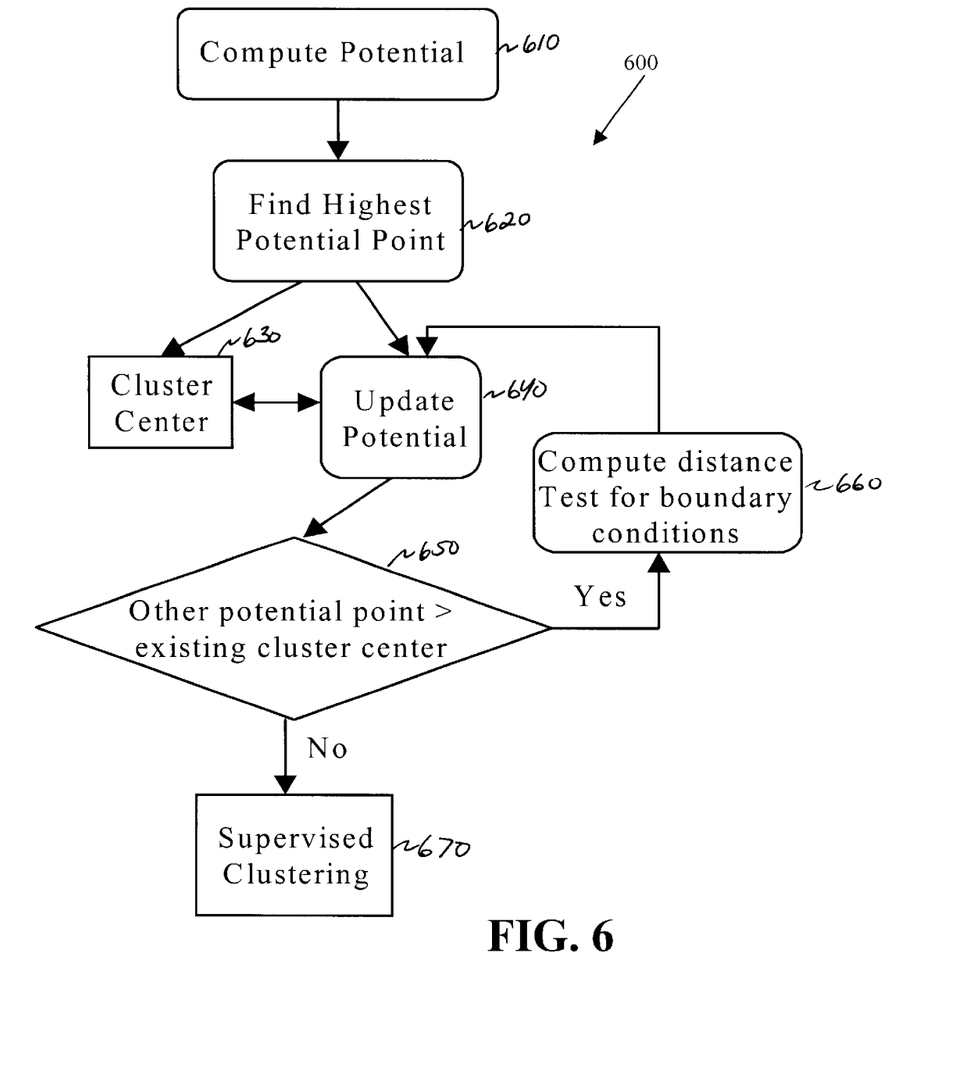
FIG. 6 is a flow chart describing the unsupervised clustering process of FIG. 5.

As previously indicated, the cluster generator 350 employs an unsupervised clustering process 600, shown in FIG. 6, to identify clusters associated with objects of interest. In the illustrative embodiment, the unsupervised clustering process 600 utilizes a subtractive clustering technique. For a more detailed discussion of subtractive clustering techniques, see, for example, Stephen L. Chiu, Fuzzy Model Identification Based on Cluster Estimation, Journal of Intelligent and Fuzzy Systems, Vol. 2. 267–278 (1994), incorporated by reference herein.

FIG. 6 is a flow chart describing the unsupervised clustering process 600 that identifies clusters associated with objects of interest, such as the current speaker. Consider a collection of n data points $\{x_1, x_2, \ldots, x_n\}$ in an M-dimensional space, where each data point is a potential cluster center. A measure of the potential of a given data point $x_i$ is defined as:

$$P_i = \sum_{j=1}^{n} e^{-\alpha \|x_i - x_j\|^2} \qquad (1)$$

where $$\alpha = \frac{4}{r_a^2}$$

and $r_a$ is a positive constant. Thus, the measure of the potential for a data point is a function of its distances to all other points. A data point with many neighboring data points will have a high potential value. The constant $r_a$ is effectively the radius defining a neighborhood. Data points outside this radius have little influence on the potential.

As shown in FIG. 6, the potential of every data point is computed during step 610. Thereafter, the data point with the highest potential is selected during step 620 as the first cluster center during step 630. Let $x_1$ be the location of the first cluster center and $P_1$ be the corresponding potential value. The potential of each data point $x_i$ is then revised during step 640 as follows:

$$P_i \leftarrow P_i - P_1 * e^{\beta \|x_i - x_1^*\|^2} \qquad (2)$$

where $$\beta = \frac{4}{r_b^2}$$

and $r_b$ is a positive constant. Thus, an amount of potential is subtracted from each data point in equation (2) as a function of its distance from the first cluster center. The data points near the first cluster center will have greatly reduced potential, and therefore are unlikely to be selected as the next cluster center. To avoid obtaining closely spaced cluster centers, $r_b$ is set to be somewhat greater than $r_a$. A good choice has been found to be $r_b = 1.5 \ r_a$.

When the potential of all data points has been revised according to equation (2), the data point with the highest remaining potential is selected as the second cluster center. The potential of each data point is then further reduced according to their distance to the second cluster center. In general, after the kth cluster center has been obtained, the potential of each data point is revised by the following formula:

$$P_i \leftarrow P_i - P_k^* e^{-\beta \|x_i - x_k^*\|^2}$$

where $x_k^*$ is the location of the kth cluster center and $P_k^*$ is its potential value.

The process of acquiring new cluster centers and revising potentials repeats until the following criteria is satisfied during step 650. If $P^*_k > \bar{\epsilon} P^*_1$, accept $x_k^*$ as a cluster center and continue to step 660. Otherwise, if $P^*_k \leq \underline{\epsilon} P^*_1$, $x_k^*$ is rejected and the clustering process 600 ends during step 670.

During step 660, a distance test is performed where $d_{min}$ equals the shortest of the distances between $x_k^*$ and all previously found cluster centers.

$$\text{If } \frac{d_{min}}{r_a} + \frac{P_k^*}{P_1^*} \geq 1,$$

then $x_k^*$ is accepted as a cluster center and processing continues. Otherwise, $x_k^*$ is rejected and the potential is set at $x_k^*$ to 0 during step 640. The data point with the next highest potential is selected as the new $x_k^*$ and is retested during step 650.

Figure 7:
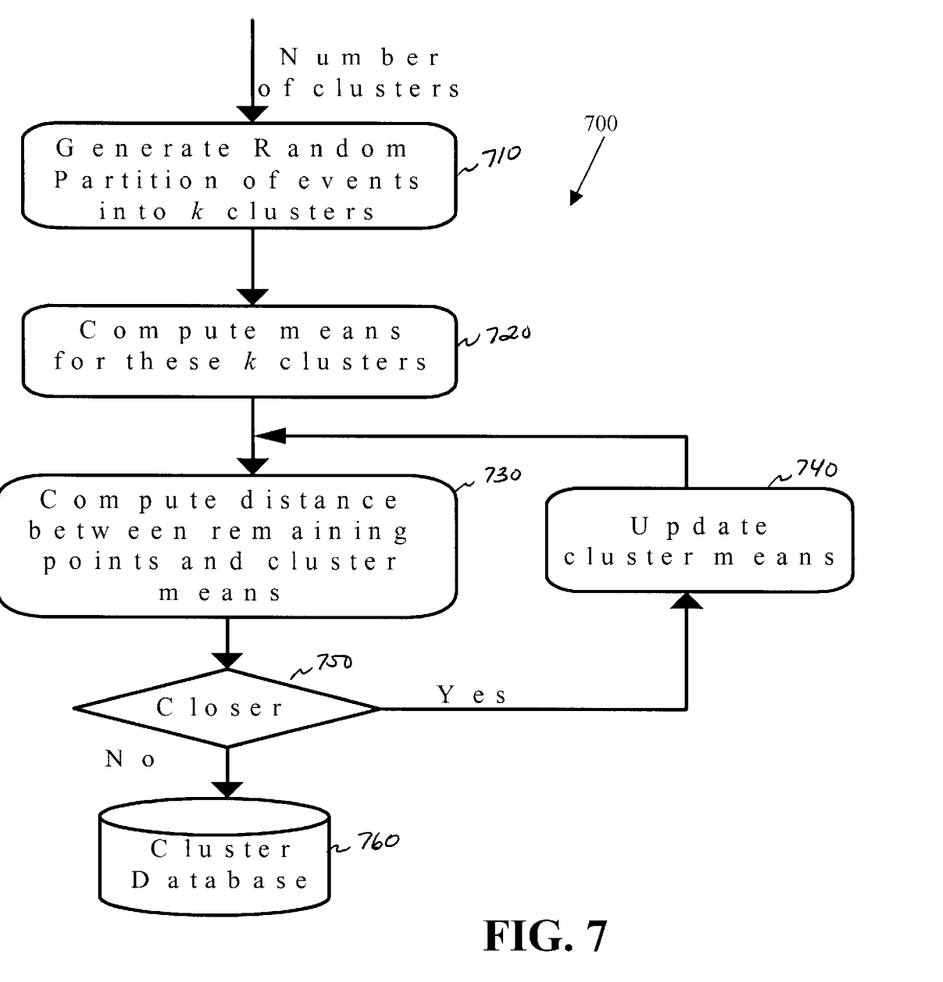
FIG. 7 is a flow chart describing the supervised clustering process of FIG. 5.

FIG. 7 is a flow chart describing the illustrative supervised clustering process 700 that employs a k-means clustering process to fine-tune the clusters established by the unsupervised clustering routine 600. For a more detailed discussion of k-means clustering techniques, see, for example, P. A. Devijver & J. Kittler, Pattern Recognition—A Statistical Approach, Prentice Hall International, 409 (1982), incorporated by reference herein.

As shown in FIG. 7, the supervised clustering process 700 receives the number of clusters identified by the unsupervised clustering process 600. Thereafter, the supervised clustering process 700 generates a random partition of the data set Y into k clusters during step 710. Thus, if $r_j$, j=1,2, ...,k, then the mean vectors $m_j$, j=1,2, ...,k are computed during step 720.

A point y is selected in Y during step 730 and the point y is assigned to that cluster whose mean is closest to y. In other words, y is assigned to $r_j$ if dist (y, $m_j$)=$\min_k$ dist (y, $m_k$). A test is performed during step 750 to determine if a complete scan of the data samples in Y results in a change of the cluster means from one iteration to another. If there is a change, then the mean vectors are updated during step 740, as follows, $m_j$, j=1,2, ...,k and program control returns to step 730.

If there is no change, then program control terminates during step 760 and the established cluster values are recorded in the cluster database 370.

As previously indicated, the similarity estimator 360 finds similarity between the average of the events in the 2 second intervals with the clusters found by the cluster generator 350 in the initial five second interval and indexed into the cluster database 360. Similarity is found through the use of the well-known Euclidean distance metric. The cluster center in the database 360 that is closest to the current cluster is used by the heuristic module 380 to send information to the camera 18 to focus properly.

Figure 8:
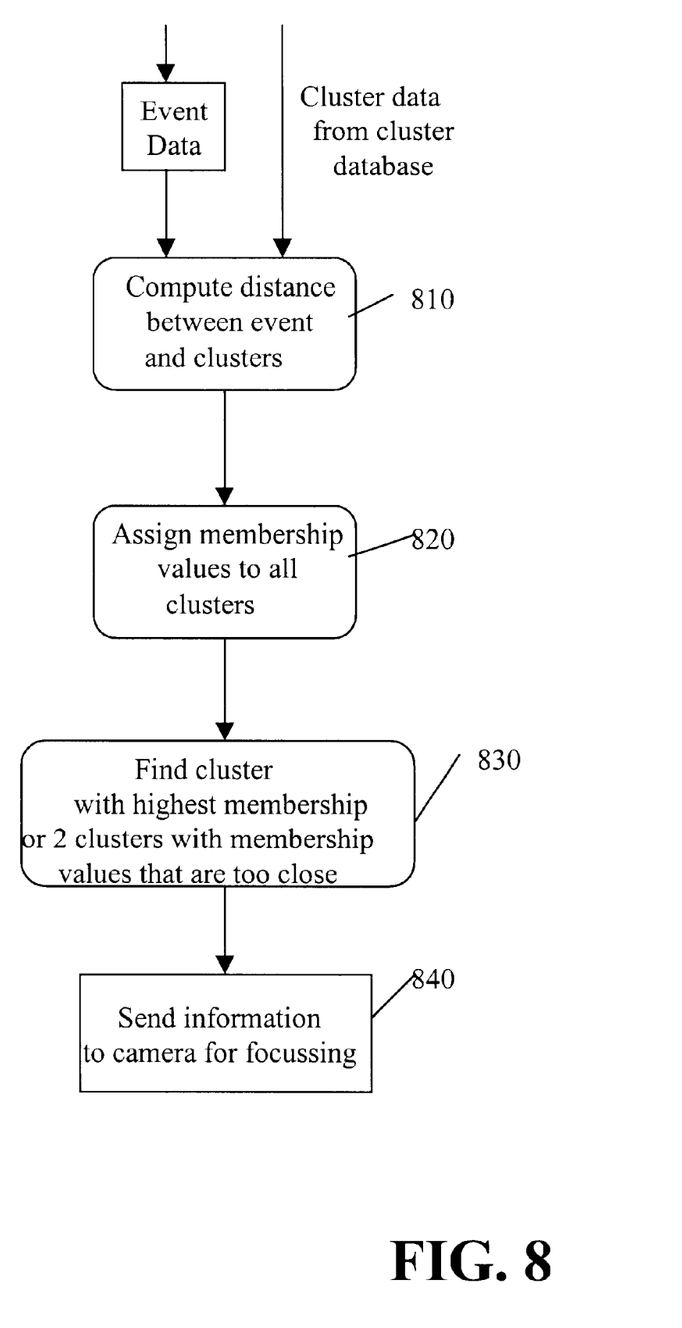
FIG. 8 is a flow chart describing the similarity estimator of FIG. 3 from a process point of view.

FIG. 8 is a flow chart describing the similarity estimator 360 from a process point of view. As shown in FIG. .8, the similarity estimator 360 receives event data (a current data point being processed) from the event accumulator 340, and cluster data from the history database 370. Initially, the similarity estimator 360 computes the distance between the current data point and all previously identified clusters during step 810. If the distance values computed during step 810 are not within a predefined threshold of any cluster, then the similarity estimator 360 may establish a new cluster. Thereafter, the similarity estimator 360 assigns a membership value for each cluster during step 820, indicating the probability that the data point belongs to the corresponding cluster. The membership value, $u_i(x)$, may be computed during step 820 as follows:

$$u_i(x) = \frac{1/\|x - Z_i\|^{2/(m-1)}}{\sum_{j=1}^{c} (1/\|x - Z_j\|^{2/(m-1)})}$$

where the variable m determines how heavily the distance is weighted when calculating each clusters contribution to the membership value. If m is 2, then the contribution of each neighboring cluster is weighted by the reciprocal of its distance from the point being classified. As m increases, the clusters are more evenly weighted, and their relative distances from the point being classified have less effect. As m approaches 1, the closer clusters are weighted far more heavily than those farther away, which has the effect of reducing the number of clusters that contribute to the membership value of the point being classified. Furthermore, x is the data vector containing pan, tilt and zoom values and Z is the cluster.

During step 830, the similarity estimator 360 identifies the single cluster with the highest membership value (probability) or the two clusters with membership values within a predefined tolerance of each other (too close to separate). Finally, the similarity estimator 360 sends the average pan, tilt and zoom values associated with the selected cluster(s) to the camera 18 during step 840. In this manner, if more than one cluster is identified during step 830 the camera will focus on more than one cluster, rather than attempting to identify the actual speaker.

The above-described embodiment of the invention is intended to be illustrative only. For example, the invention can be used to implement real-time tracking of any desired object of interest, and in a wide variety of applications, including video conferencing systems, video surveillance systems, and other camera-based systems. In addition, although illustrated using a system with a single PTZ camera, the invention is also applicable to systems with multiple PTZ cameras, and to systems with other types and arrangements of image capture devices. Moreover, the invention can utilize many different types of techniques to detect and track an object of interest, and to extract and interpolate a region of interest. The invention can also be implemented at least in part in the form of one or more software programs which are stored on an electronic, magnetic or optical storage medium and executed by a processing device, e.g., by the processor 12 of system 10. These and numerous other embodiments within the scope of the following claims will be apparent to those skilled in the art.

What is claimed is:

1. A method for tracking a plurality of objects of interest in an image space in a video processing system, said video processing system including a camera and processing at least one of audio and video information, the method comprising the steps of:

partitioning said image space into at least two approximate regions each associated with one of said objects of interest;

processing at least one of said audio and video information to identify a current object of interest;

computing a probability, separately for each of said at least two approximate regions, that said current object of interest belongs to each of said at least two approximate regions; and focusing said camera on one or more of the at least two approximate regions based on the probabilities computed in said computing step, wherein said partitioning step further comprises the step of clustering pan and tilt values generated by an audio locator for a given time interval, and further wherein said partitioning step further comprises the step of clustering zoom values generated by a video locator for a given time interval, and still further wherein said pan, tilt and zoom values comprise a data point and said clustering step further comprises the steps of:

computing a potential for said data point as a function of the distance of said data point to all other data points;

selecting a data point with a highest potential as a cluster center;

adjusting said potential values as a function of a distance from said selected cluster center; and repeating said steps until a predefined threshold is satisfied.

2. The method of claim 1 wherein said clustering step further comprises the step of performing an unsupervised clustering process during an initialization period.

3. The method of claim 1 wherein said clustering step further comprises the step of performing a supervised clustering process.

4. The method of claim 1 wherein said computing and focusing steps are performed at specified intervals.

5. The method of claim 1 wherein said focusing step focuses said camera on a plurality of said approximate regions if the probabilities computed in said computing step for said plurality of approximate regions are within a predefined threshold of each other.

6. The method of claim 1 wherein said focusing step focuses said camera on one of said approximate regions if probabilities computed in said computing step for said one approximate region is not within a predefined threshold of any of probabilities computed in said computing step for other approximate regions.

7. A system for tracking a plurality of objects of interest in an image space in a video processing system, said video processing system including a camera and processing at least one of audio and video information, comprising:

a memory for storing computer readable code; and processor operatively coupled to said memory, said processor configured to:

partition said image space into at least two approximate regions each associated with one of said objects of interest;

process at least one of said audio and video information to identify a current object of interest;

compute a probability, separately for each of said at least two approximate regions, that said current object of interest belongs to each of said at least two approximate regions; and focus said camera on one or more of the at least two approximate regions based on the probabilities computed in the step to compute a probability, wherein said partitioning step further comprises the step of clustering pan and tilt values generated by an audio locator for a given time interval, and further wherein said partitioning step further comprises the step of clustering zoom values generated by a video locator for a given time interval, and still further wherein said pan, tilt and zoom values comprise a data point and said clustering step further comprises the steps of:

computing a potential for said data point as a function of the distance of said data point to all other data points;

selecting a data point with a highest potential as a cluster center;

adjusting said potential values as a function of a distance from said selected cluster center; and repeating said steps until a predefined threshold is satisfied.

8. An article of manufacture for tracking a plurality of objects of interest in an image space in a video processing system, said video processing system including a camera and processing at least one of audio and video information, comprising:

a computer readable medium having computer readable code means embodied thereon, said computer readable program code means comprising:

a step to partition said image space into at least two approximate regions each associated with one of said objects of interest;

a step to process at least one of said audio and video information to identify a current object of interest;

a step to compute a probability, separately for each of said at least two approximate regions, that said current object of interest belongs to each of said at least two approximate regions; and a step to focus said camera on one or more of the at least two approximate regions based on the probabilities computed in the step to compute a probability:

wherein said step to partition further comprises the step of clustering pan and tilt values generated by an audio locator for a given time interval, and further wherein said step to partition further comprises the step of clustering zoom values generated by a video locator for a given time interval, and still further wherein said pan, tilt and zoom values comprise a data point and said clustering step further comprises the steps of:

computing a potential for said data point as a function of the distance of said data point to all other data points;

selecting a data point with a highest potential as a cluster center;

adjusting said potential values as a function of a distance from said selected cluster center; and repeating said steps until a predefined threshold is satisfied.

* * * * *